United States Patent
Garreau et al.

(10) Patent No.: US 11,867,065 B2
(45) Date of Patent: Jan. 9, 2024

(54) BLADE FOR A ROTATING BLADED DISK FOR AN AIRCRAFT TURBINE ENGINE COMPRISING A SEALING LIP HAVING AN OPTIMIZED NON-CONSTANT CROSS SECTION

(71) Applicant: SAFRAN AIRCRAFT ENGINES, Paris (FR)

(72) Inventors: Edouard Emmanuel Garreau, Moissy-Cramayel (FR); Josserand Jacques Andre Bassery, Moissy-Cramayel (FR); Lucas Geoffrey Desbois, Moissy-Cramayel (FR); Etienne Leon Francois, Moissy-Cramayel (FR); Samuel Laurent Noel Mathieu Juge, Moissy-Cramayel (FR); Elsa Maxime, Moissy-Cramayel (FR); Ba-Phuc Tang, Moissy-Cramayel (FR); Denis Gabriel Trahot, Moissy-Cramayel (FR); Thomas Tsassis, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/760,369

(22) PCT Filed: Feb. 11, 2021

(86) PCT No.: PCT/FR2021/050247
§ 371 (c)(1),
(2) Date: Aug. 9, 2022

(87) PCT Pub. No.: WO2021/165600
PCT Pub. Date: Aug. 26, 2021

(65) Prior Publication Data
US 2023/0068236 A1 Mar. 2, 2023

(30) Foreign Application Priority Data

Feb. 19, 2020 (FR) .................................. 2001640

(51) Int. Cl.
*F01D 11/00* (2006.01)

(52) U.S. Cl.
CPC ...... *F01D 11/001* (2013.01); *F05D 2220/323* (2013.01); *F05D 2250/141* (2013.01);
(Continued)

(58) Field of Classification Search
CPC .......... F01D 11/00; F01D 11/001; F01D 5/02; F01D 5/12; F01D 5/14; F01D 5/141;
(Continued)

(56) References Cited

U.S. PATENT DOCUMENTS

| 2007/0031260 A1* | 2/2007 | Dube ................. F01D 5/147 416/193 A |
| 2011/0243749 A1* | 10/2011 | Praisner ............ F01D 11/00 416/223 A |
| 2016/0348525 A1 | 12/2016 | Thornton | |

FOREIGN PATENT DOCUMENTS

| EP | 2 372 102 A2 | 10/2011 |
| EP | 3 101 236 A1 | 12/2016 |
| FR | 3 074 217 A1 | 5/2019 |

OTHER PUBLICATIONS

International Search Report dated May 17, 2021 in PCT/FR2021/050247 filed on Feb. 11, 2021.
(Continued)

*Primary Examiner* — Elton K Wong
(74) *Attorney, Agent, or Firm* — Oblon, McClelland, Maier & Neustadt, L.L.P.

(57) ABSTRACT

To increase the inertia of a sealing lip of a blade for an aircraft turbine engine, and thus improve the service life of such a sealing lip, the sealing lip is conformed so as to have (Continued)

a trough in the outer surface thereof and a corresponding boss in the inner surface thereof, the trough and the boss being defined based on a connection cross section of the sealing lip to a blade body, and being formed at a distance from a free axial end of the sealing lip.

10 Claims, 5 Drawing Sheets

(52) U.S. Cl.
CPC .. *F05D 2250/711* (2013.01); *F05D 2250/712* (2013.01); *F05D 2250/713* (2013.01)

(58) Field of Classification Search
CPC .......... F01D 5/142; F01D 5/143; F01D 5/145; F01D 5/146; F01D 5/147; F01D 5/148; F01D 5/225; F05D 2250/141; F05D 2250/711; F05D 2250/712; F05D 2250/713; F05D 2260/941; F05D 2240/80; F05D 2220/323
See application file for complete search history.

(56) References Cited

OTHER PUBLICATIONS

Preliminary French Search Report dated Sep. 25, 2020 in French Application 2001640 filed on Feb. 19, 2020.

\* cited by examiner

BLADE FOR A ROTATING BLADED DISK FOR AN AIRCRAFT TURBINE ENGINE COMPRISING A SEALING LIP HAVING AN OPTIMIZED NON-CONSTANT CROSS SECTION

TECHNICAL FIELD

The present invention relates to a blade for a rotating bladed disk for an aircraft turbine engine, comprising at least one sealing lip extending axially projecting from a body of the blade and having two opposite circumferential ends, and a free axial end whose cross section is delimited internally and externally respectively by two concentric circle portions.

PRIOR ART

In a turbine engine, sealing between a rotating bladed disk and the stator structure disposed immediately upstream and downstream from the rotating bladed disk is sometimes performed by the cooperation between sealing lips, which extend axially projecting from a body of each blade of the rotating bladed disk, and suitable elements belonging to the stator structures cited above. Such sealing lips can be arranged at the blade root and/or at the blade head, on the upstream side and/or the downstream side of the blade, thus making possible to limit air leaks from the primary flowpath.

In operation, the sealing lips are subjected to centrifugal force due to the rotation of the bladed disk, and are hence essentially subjected to flexural stress.

In some cases, particularly in the case of high-speed low-pressure turbines for ultra-high bypass ratio (UHBR) turbine engines, for example with a bypass ratio equal to approximately 15, the stress in the sealing lips is liable to reach a critical level.

DESCRIPTION OF THE INVENTION

The aim of the invention is particularly that of providing a simple, economical and effective solution for this problem.

To this end, it proposes a blade for a rotating bladed disk for an aircraft turbine engine, comprising at least one sealing lip extending axially projecting from a body of the blade and having two opposite circumferential end surfaces, and a free axial end wherein the cross section is delimited internally and externally respectively by two concentric circle portions.

According to the invention, the sealing lip has a connection cross section to the body of the blade which is delimited internally and externally respectively by an internal curved line and by an external curved line, each of the internal and external curved lines comprising:

- a respective median portion, which is convex in a direction from a head of the blade to a root of the blade;
- a respective first intermediate portion, which continuously extends from the respective median portion towards a first of the circumferential end surfaces of the sealing lip, and which is concave in the direction from the head of the blade to the root of the blade, whereby a respective first point of inflection separates the respective median portion from the respective first intermediate portion;
- a respective second intermediate portion, which continuously extends from the respective median portion towards a second of the circumferential end surfaces of the sealing lip, and which is concave in the direction from the head of the blade to the root of the blade, whereby a respective second point of inflection separates the respective median portion from the respective second intermediate portion; and
- a respective first end portion and a respective second end portion which respectively continuously extend from the respective first intermediate portion and the respective second intermediate portion, respectively to the first and to the second of the circumferential end surfaces of the sealing lip.

Each portion of the internal curved line is defined facing the corresponding portion of the external curved line, along the direction from the head of the blade to the root of the blade.

The cross section of the sealing lip is continuously non-constant from the connection cross section to the body of the blade to the free axial end of the sealing lip.

The configuration of the sealing lip according to the invention makes it possible to increase the inertia thereof, at least in a region close to the connection cross section to the body of the blade.

The inventors indeed identified that the stress sustained by sealing lips of the known type was maximum along the connection cross section to the body of the blade and in the vicinity of this section, and decreased towards the free axial end of such a sealing lip.

The sealing lip according to the invention is thus capable of better withstanding high stress, particularly in a so-called "high-speed" low-pressure turbine.

The invention furthermore has the advantage of not inducing a significant increase in mass of a sealing lip compared to a configuration of known type.

Preferably, the external curved line forms an image of the internal curved line by a homothetic transformation.

Preferably, for each of the internal and external curved lines, the respective median portion has a respective extremum which is offset, in the direction from the head of the blade to the root of the blade, with respect to the respective circumferential ends of the curved line in question, by a distance which is greater than half a distance separating the respective extrema of the respective median portions of the internal and external curved lines, and which is less than one and a half times the distance separating the respective extrema of the respective median portions of the internal and external curved lines.

The invention also relates to a rotatable bladed disk for an aircraft turbine engine, comprising an annular row of blades of the type described above, distributed about an axis of the rotating bladed disk, and in each whereof the two concentric circle portions, which delimit respectively internally and externally the cross section of the free axial end of the sealing lip, have a common centre of curvature located on the axis of the rotatable bladed disk.

Preferably, for each of the blades, the homothetic transformation, whereby the external curved line forms an image of the internal curved line, is a proportional transformation wherein the centre is located on the axis of the rotating bladed disk.

Preferably, for each of the blades, the respective first and second end portions are circle portions having a common centre of curvature located on the axis of the rotating bladed disk.

Preferably, the respective sealing lips of the blades extend in aerodynamic continuity pairwise.

The invention also relates to a turbine for an aircraft turbine engine, comprising at least one rotating bladed disk of the type described above.

The invention also relates to an aircraft turbine engine, comprising at least one rotating bladed disk of the type described above.

In embodiments of the invention, the turbine comprises a high-pressure core and a low-pressure core, and the low-pressure core includes a turbine of the type described above.

BRIEF DESCRIPTION OF THE DRAWINGS

The invention will be better understood, and further details, advantages and features thereof will emerge on reading the following detailed description drafted by way of non-limiting example and with reference to the appended drawings wherein.

Throughout these figures, identical references may denote identical or equivalent elements.

DETAILED DESCRIPTION OF PREFERRED EMBODIMENTS

Figure 1:
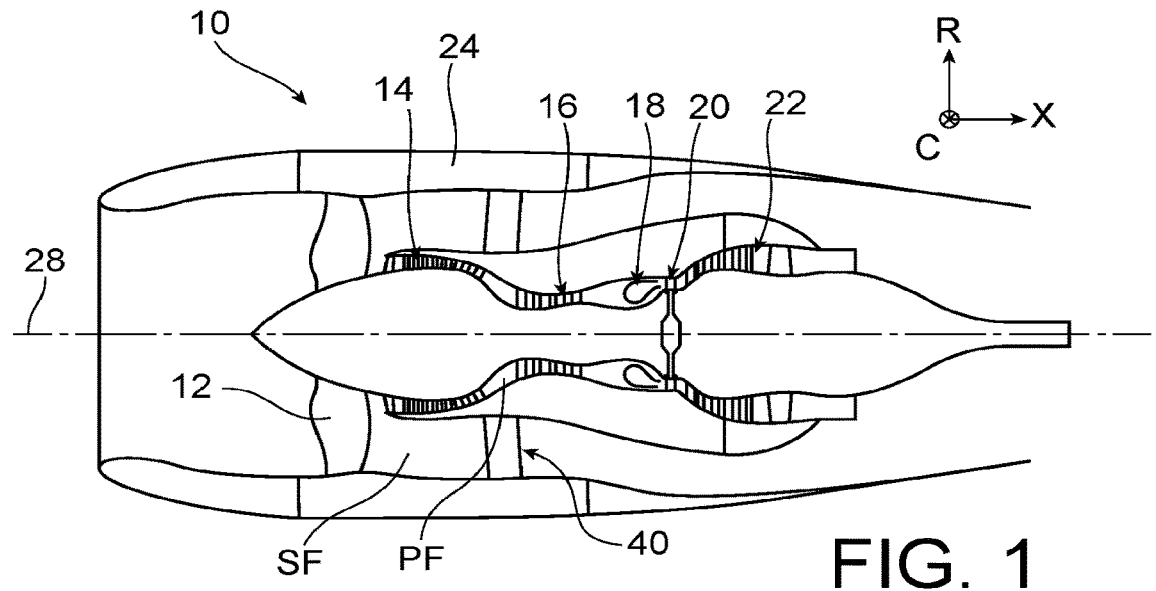
FIG. 1 is a schematic axial sectional view of an aircraft turbine engine according to a preferred embodiment of the invention.

FIG. 1 illustrates an aircraft turbine engine 10, including as a general rule a fan 12 intended for the suction of an air flow split downstream from the fan into a primary stream circulating in a primary flow channel, hereinafter called the primary flowpath PF, in the core of the turbine engine, and a secondary flow bypassing this core in a secondary flow channel, hereinafter called the secondary flowpath SF.

The turbine engine is for example of the dual-flow, dual-core type. The core of the turbine engine thus includes, as a general rule, a low-pressure compressor 14, a high-pressure compressor 16, a combustion chamber 18, a high-pressure turbine 20 and a low-pressure turbine 22.

The respective rotors of the high-pressure compressor and the high-pressure turbine are connected by a rotor shaft called the "high-pressure shaft", whereas the respective rotors of the low-pressure compressor and the low-pressure turbine are connected by a rotor shaft called the "low-pressure shaft".

The turbine engine is faired by a nacelle 24 surrounding the secondary flowpath SF.

The rotor shafts are rotatably mounted about an axis 28 of the turbine engine.

Throughout this description, the axial direction X is the direction of the axis 28. The radial direction R is in any point orthogonal to the axis 28 and passing therethrough, and the circumferential direction C is in any point orthogonal to the radial direction R and to the axis 28. A transverse plane is an orthogonal plane to the axis 28. The terms "inner" and "outer" respectively refer to a relative proximity, and a relative distance, of an element with respect to the axis 28. Finally, the "upstream" and "downstream" directions are defined with reference to the general direction of the gas flow in the primary PF and secondary SF flowpaths of the turbine engine, along the axial direction X.

Figure 2:
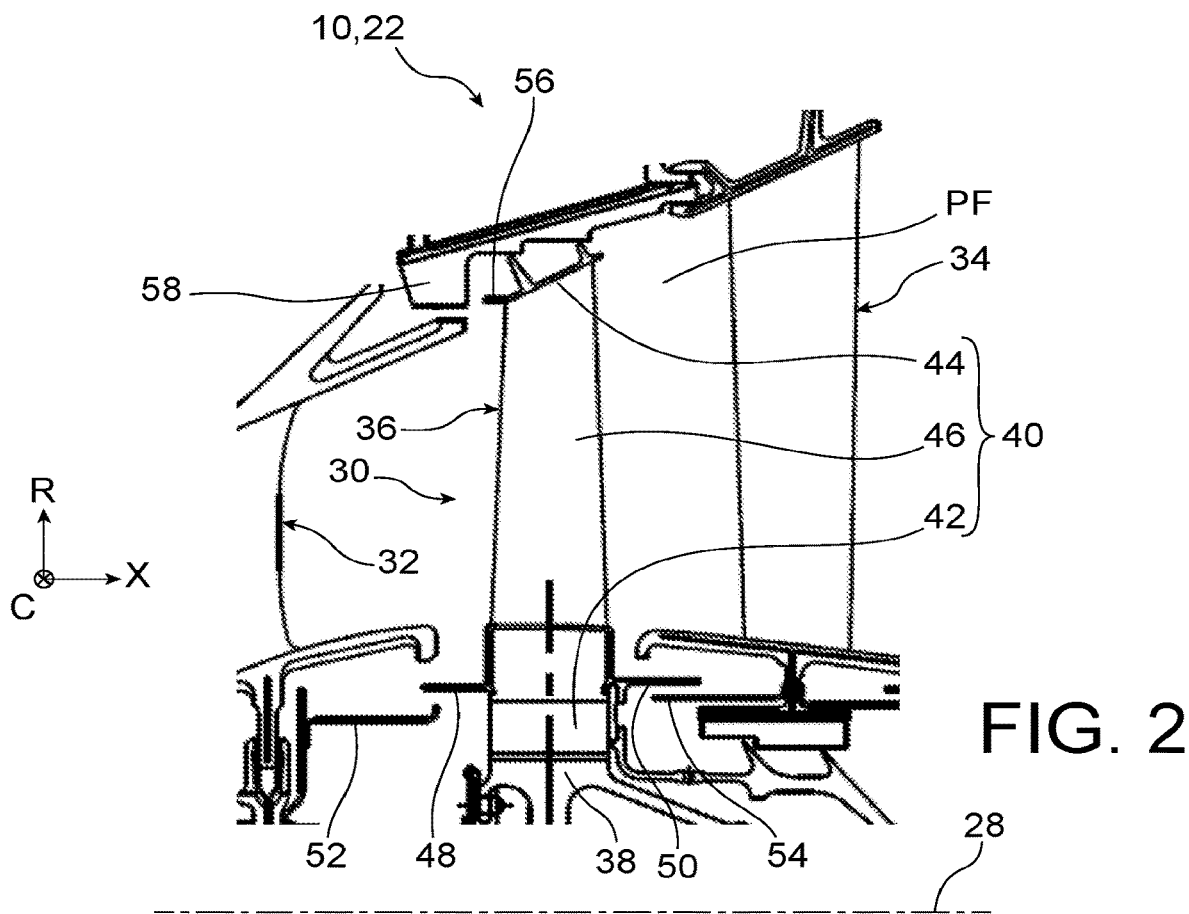
FIG. 2 is a schematic partial axial sectional half-view of a low-pressure turbine of the turbine engine in FIG. 1, comprising a rotating bladed disk provided with blades according to a preferred embodiment of the invention.

FIG. 2 illustrates a rotating bladed disk 30 and two stator structures 32 and 34 respectively arranged upstream and immediately downstream from the rotating bladed disk 30.

The rotating bladed disk 30 is for example arranged in the low-pressure turbine 22, for example at the inlet of the low-pressure turbine 22 in which case the two stator structures 32 and 34 cited above are respectively an inter-turbine frame and a guide-vane assembly.

The rotating bladed disk 30 comprises an annular row of blades 36, one of which can be seen in FIG. 2. These blades 36 are borne by a disk 38 or integral with such a disk. Each blade 36 comprises a body 40 formed from a root 42 at the radially inner end of the blade, a head 44, for example in the shape of a heel, formed at the radially outer end of the blade, and a airfoil 46 connecting the root 42 to the head 44.

Sealing means are provided in order to limit the air leaks from the primary flowpath PF, which would be capable of negatively impacting turbine engine performance.

At the radially inner end of the primary flowpath PF, these sealing means comprise for example sealing lips 48 extending axially towards upstream from the body 40 of each blade 36, at the root 42 of the blade, as well as sealing lips 50 extending axially towards downstream from the body 40 of each blade 36, also at the root 42 of the blade. The sealing lips 48 and 50 respectively cooperate with inner sealing rings 52 and 54 respectively borne by the two stator structures 32 and 34.

At the radially outer end of the primary flowpath PF, the sealing means comprise for example sealing lips 56 extending axially towards upstream from the body 40 of each blade 36, from the head 44 of the blade, and cooperating with an outer sealing ring 58.

FIGS. 3 to 6 illustrate an example of a sealing lip 48 according to a known configuration.

Figure 3:
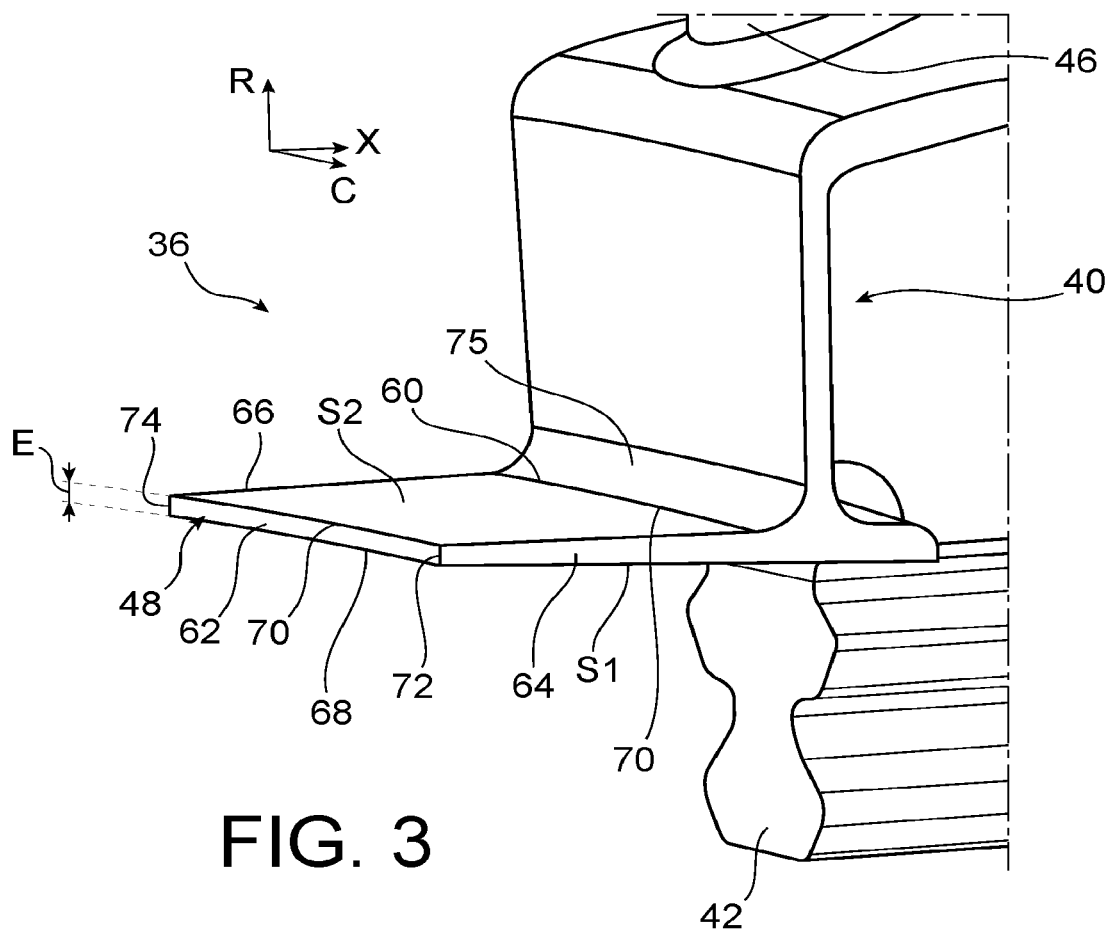
FIG. 3 is a schematic partial perspective view of a blade comprising a sealing lip according to a configuration of known type.
Figure 4:
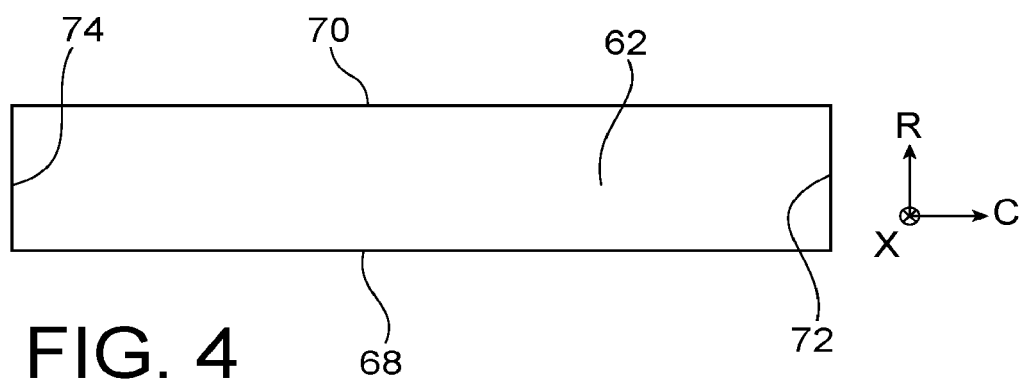
FIG. 4 is a schematic front view of a free end of the sealing lip of the blade in FIG. 3, wherein the general curvature of the sealing lip is disregarded.

Such a sealing lip 48 extends axially projecting from the body 40 of the blade 36 in question (FIG. 3). In other words, the sealing lip 48 has a connection cross section 60 to the body of the blade (FIGS. 5 and 6), whereby the sealing lip 48 is connected to the body 40 of the blade 36, as well as a free axial end 62 (FIGS. 3 and 4). Furthermore, the sealing lip 48 has two opposite circumferential end surfaces 64 and 66 each connecting the connection cross section 60 to the body of the blade at the free end 62 of the sealing lip 48 (FIG. 3).

The sealing lip 48 typically has a thickness E (i.e. an extension along the radial direction R) which is reduced from the connection cross section 60 to the body of the blade to the free axial end 62 of the sealing lip 48.

Disregarding this reduction in thickness, the sealing lip 48 has, in the known configuration thereof, a cross section of constant shape from the connection cross section 60 to the body of the blade up to the free axial end 62 of the sealing lip 48.

More specifically, in any cross-sectional plane, the sealing lip 48 is delimited internally and externally respectively by two respectively inner and outer circle portions 68 and 70, which are concentric and the common centre of curvature whereof is located on the axis of the rotating bladed disk 30, which coincides with the axis 28 of the turbine engine. It should be noted that the outer circle portion 70 thus forms an image of the inner circle portion 68 by a homothetic transformation having as a centre a point located on the axis 28 of the turbine engine.

The two circle portions 68 and 70 are connected to one another at each of the circumferential ends thereof, respectively by two line segments 72 and 74 respectively inscribed in the two opposite circumferential end surfaces 64 and 66 of the sealing lip 48.

The joining of the inner circle portions 68 defined respectively in any cross-sectional plane of the sealing lip 48 forms an inner surface S1 of the sealing lip. Similarly, the joining of the outer circle portions 70 defined respectively in any cross-sectional plane of the sealing lip 48 forms an outer surface S2 of the sealing lip.

The line segments 72 and 74 each extend radially. Thus, the first circumferential end surface 64, which is formed by the joining of the line segments 72 defined respectively in any cross-sectional plane of the sealing lip 48, is inscribed in a plane passing through the axis 28 of the turbine engine. Similarly, the second circumferential end surface 66, which is formed by the joining of the line segments 74 defined respectively in any cross-sectional plane of the sealing lip 48, is inscribed in another plane also passing through the axis 28 of the turbine engine.

Figure 6:
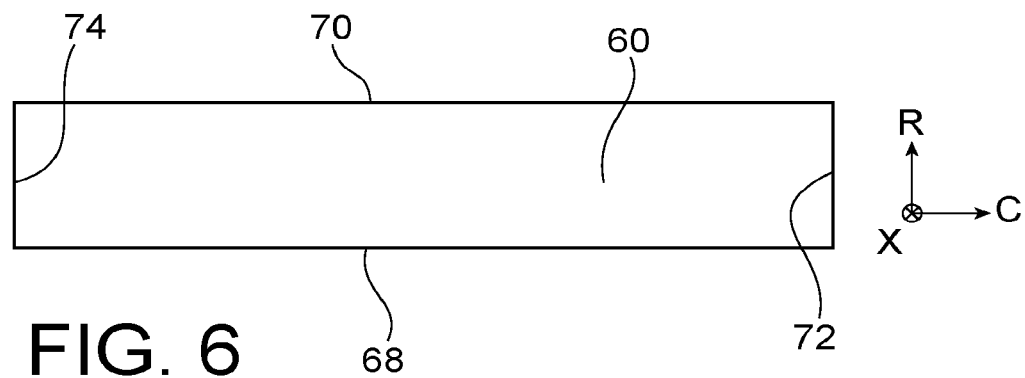
FIG. 6 is a schematic sectional view of the sealing lip of the blade in FIG. 3, in the plane of the connection section of the sealing lip to the body of the blade, wherein the general curvature of the sealing lip is disregarded.

FIGS. 4 and 6, which respectively illustrate the free axial end 62 and the connection cross section 60 to the body of the blade, disregard the general curvature of the sealing lip 48, such that the corresponding cross sections appear in the form of rectangles in these figures.

Figure 5:
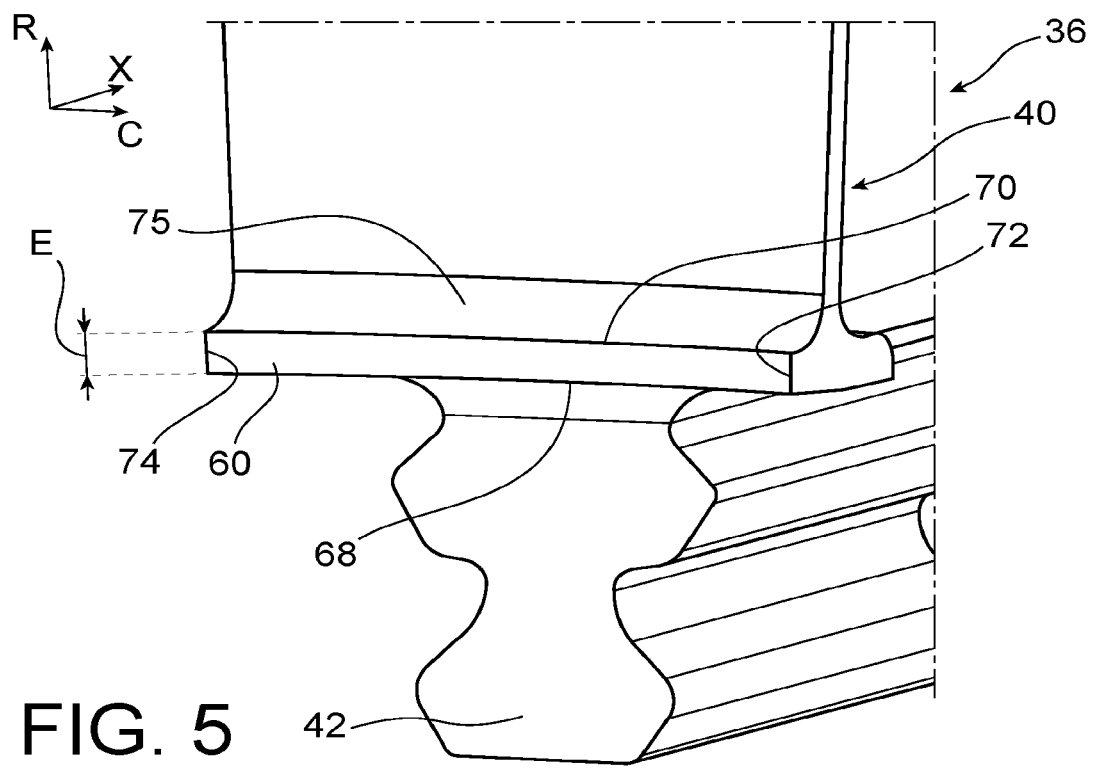
FIG. 5 is a schematic partial perspective and cross-sectional view of the blade in FIG. 3, illustrating a connection section of the sealing lip to a body of the blade.

Moreover, as shown in FIGS. 3 and 5, the outer surface S2 of the sealing lip 48 is connected to the body 40 of the blade by a fillet 75.

FIGS. 7 to 10 illustrate an example of a sealing lip 48 according to a preferred embodiment of the invention and are respectively analogous to FIGS. 3-6.

The sealing lip 48 in FIGS. 7-10 differs from the sealing lip of known type described above in that the connection cross section 60 to the body of the blade is delimited internally and externally by an internal curved line 76 and by an external curved line 78 (FIG. 9), which each comprise a respective median portion 80, a respective first intermediate portion 82, a respective second intermediate portion 84, a respective first end portion 86 and respective second end portion 88 (FIG. 10), the features whereof are detailed below for any one of the internal 76 and external curved lines 78 and are also valid for the other of the internal 76 and external curved lines 78.

The respective median portion 80 is convex in a direction D from the head 44 of the blade to the root 42 of the blade. The direction D is locally parallel with and in the opposite direction to the radial direction R. In other words, the median portion 80 is convex towards the root 42 of the blade.

The respective first intermediate portion 82 extends continuously from the respective median portion 80 towards a first circumferential end surface 64 of the sealing lip. The respective first intermediate portion 82 is concave in the direction D from the head 44 of the blade to the root 42 of the blade. Consequently, a respective first point of inflection 90 separates the respective median portion 80 from the respective first intermediate portion 82.

The respective second intermediate portion 84 extends continuously from the respective median portion 80 towards a second circumferential end surface 66 of the sealing lip. The respective second intermediate portion 84 is concave in the direction D from the head 44 of the blade to the root 42 of the blade. Consequently, a respective second point of inflection 92 separates the respective median portion 80 from the respective second intermediate portion 84.

The respective first end portion 86 continuously extends from the respective first intermediate portion 82 to a first circumferential end 94 of the curved line in question, defined in the first circumferential end surface 64 of the sealing lip 48.

The respective second end portion 88 continuously extends from the respective second intermediate portion 84 to a first circumferential end 96 of the curved line in question, defined in the second circumferential end surface 66 of the sealing lip 48.

Each of the internal 76 and external 78 curved lines thus has a respective trough located circumferentially between the circumferential ends 94 and 96 thereof and the bottom whereof is defined by the respective median portion 80.

Furthermore, each of the aforementioned portions of the internal curved line 76 is defined radially facing, and therefore facing along the direction D, the corresponding portion of the external curved line 78. Thus, the respective troughs of the internal 76 and external 78 curved lines are radially aligned.

The free axial end 62 is delimited by two circle portions, respectively inner 68 and outer 70, similarly to that described with reference to FIGS. 3-6

The cross section of the sealing lip is continuously non-constant from the connection cross section 60 to the body of the blade to the free axial end 62 of the sealing lip 48. In other words, the inner S1 and outer S2 surfaces of the sealing lip 48 have no surface discontinuity.

Consequently, in other cross-sectional planes located between the connection cross section 60 to the body of the blade and the free axial end 62, the sealing lip 48 is also delimited by internal and external curved lines which have the features stated above for the internal 76 and external 78 curved lines.

Due to the continuous non-constant nature of the cross section of the sealing lip 48, the amplitude of the trough formed by the respective median portion 80 of each of the internal and external curved lines, in a given cross-sectional plane, is especially small as this cross-sectional plane is distant from the connection cross section 60 to the body of the blade and is close to the free axial end 62.

Figure 7:
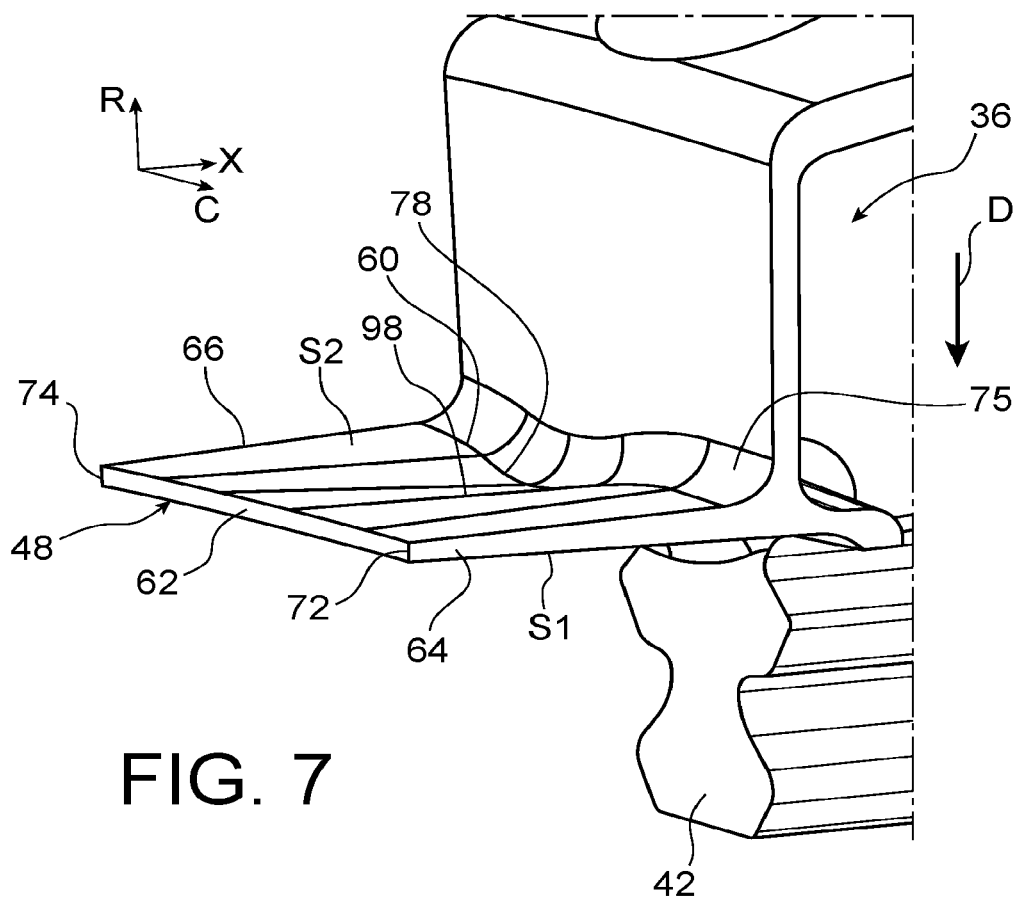
FIG. 7 is a schematic partial perspective view of a blade of the rotating bladed disk of the low-pressure turbine in FIG. 2, comprising a sealing lip arranged at the root of the blade, according to a preferred embodiment of the invention.
Figure 8:
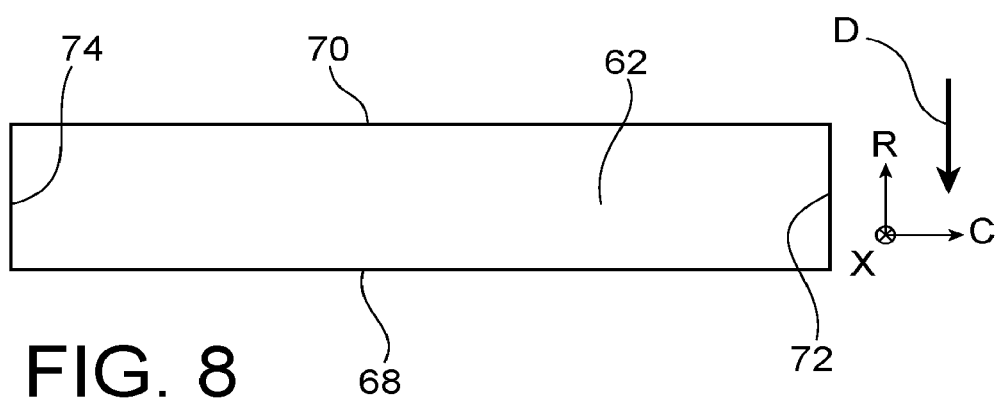
FIG. 8 is a schematic front view of a free end of the sealing lip of the blade in FIG. 7, wherein the general curvature of the sealing lip is disregarded.
Figure 9:
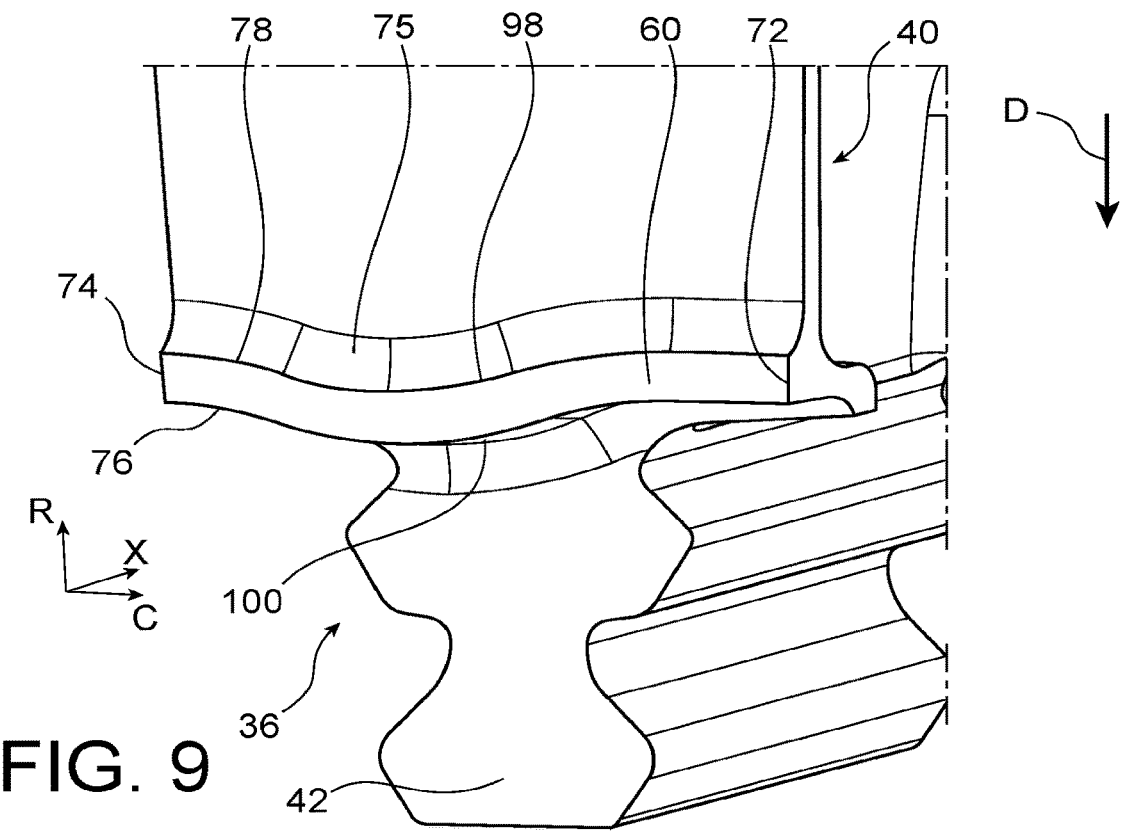
FIG. 9 is a schematic partial perspective and cross-sectional view of the blade in FIG. 7, illustrating a connection section of the sealing lip to a body of the blade.

As a result of the above, the sealing lip 48 has overall a trough 98 in the outer surface S2 thereof and a boss 100 in the inner surface S1 thereof (FIG. 7).

In the embodiment illustrated, the external curved line 78 forms an image of the internal curved line 76 by a homothetic transformation having as a centre a point located on the axis 28 of the turbine engine.

Moreover, for each of the internal 76 and external 78 curved lines, the respective median portion 80 has a respective extremum 102, 104 which is offset, in the direction D from the head 44 of the blade to the root 42 of the blade, with respect to the respective circumferential ends 94, 96 of the curved line in question, by a distance L1 which is greater than half a distance L2 separating the respective extrema 102, 104 of the respective median portions 80 of the internal 76 and external 78 curved lines, and which is less than one and a half times the distance L2 cited above. The distance L2 corresponds to the thickness of the sealing lip 48 at the bottom of the trough defined by the respective median portion 80 of the external curved line 78.

In the embodiment illustrated, for each of the internal 76 and external 78 curved lines, the respective first and second end portions 86, 88 are circle portions having a common centre of curvature located on the axis 28 of the turbine engine.

Figure 10:
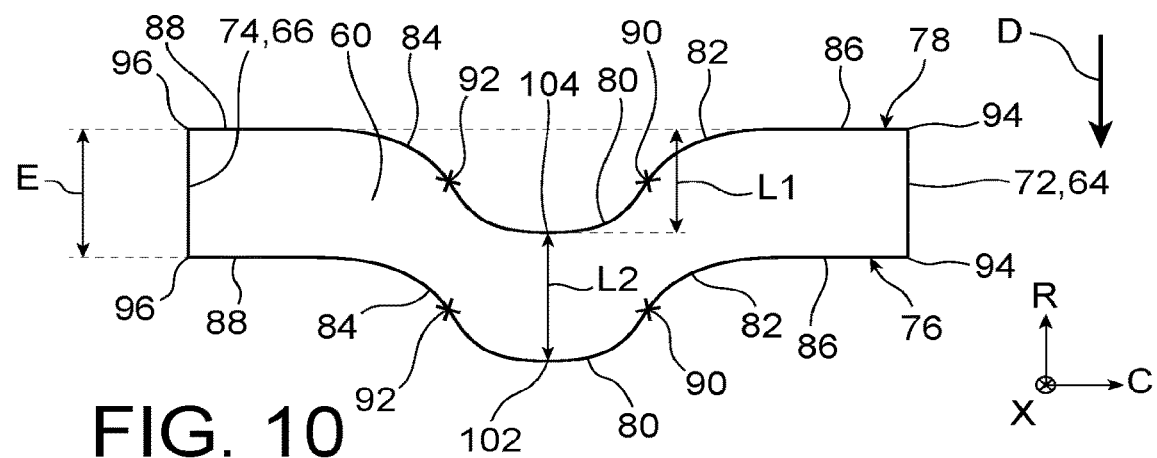
FIG. 10 is a schematic sectional view of the sealing lip of the blade in FIG. 7, in the plane of the connection section of the sealing lip to the body of the blade, wherein the general curvature of the sealing lip is disregarded.

FIG. 10 disregards the general curvature of the sealing lip 48, such that the respective end portions 86, 88 appear in a rectilinear form in this figure.

This configuration of the respective first and second end portions 86, 88 enables the respective sealing lips 48 of the blades 36 to extend in aerodynamic continuity pairwise. In other words, each first circumferential end surface 64 of a sealing lip 48 extends in circumferential alignment with a second circumferential end surface 66 of a consecutive sealing lip 48.

In this way, the set of respective inner surfaces S1 of the respective sealing lips 48 of the blades 36 substantially forms an aerodynamically continuous enclosure around the axis 28 of the turbine engine. The same applies in respect of the set of outer surfaces S2. In other words, the sealing lips 48 thus extend in aerodynamic continuity pairwise.

The specific features described above in respect of a blade root sealing lip are obviously also valid in respect of a blade head sealing lip.

As a general rule, the configuration of a sealing lip 48 according to the invention makes it possible to increase the inertia of the sealing lip, at least in a region close to the connection region to the body 40 of the corresponding blade.

The inventors indeed identified that the stress sustained by sealing lips of the known type was maximum along the connection cross section to the body of the blade and in the vicinity of this section, and decreased towards the free axial end of such a sealing lip.

For a blade root sealing lip, simulations thus demonstrated that the invention makes it possible to reduce Von Mises stress by 17% in the outer surface S2 and reduce Von Mises stress by 27% in the inner surface S1.

The sealing lips according to the invention are thus capable of better withstanding high stress, particularly in so-called "high-speed" low-pressure turbines, and hence have a greater service life.

The invention furthermore has the advantage of not inducing a significant increase in mass of a sealing lip compared to a configuration of known type.

The invention claimed is:

1. A blade for a rotating bladed disk for an aircraft turbine engine, comprising:
    a sealing lip extending axially projecting from a body of the blade and having first and second opposite circumferential end surfaces, and one free axial end,
    wherein a first cross section of the sealing lip at the free axial end is defined by two concentric circle portions extending from the first circumferential end surface to the second circumferential end surface, the first circumferential end surface, and the second circumferential end surface,
    wherein a second cross section of the sealing lip at a location where the sealing lip is connected to the body of the blade is defined by an internal curved line and by an external curved line, the first circumferential end surface, and the second circumferential end surface, each of the internal and external curved lines comprising:
    a respective median portion, which is convex in a direction from a head of the blade to a root of the blade;
    a respective first intermediate portion, which continuously extends from the respective median portion towards the first circumferential end surface of the sealing lip, and which is concave in the direction from the head of the blade to the root of the blade, whereby a respective first point of inflection separates the respective median portion from the respective first intermediate portion;
    a respective second intermediate portion, which continuously extends from the respective median portion towards the second circumferential end surface of the sealing lip, and which is concave in the direction from the head of the blade to the root of the blade, whereby a respective second point of inflection separates the respective median portion from the respective second intermediate portion; and
    a respective first end portion and a respective second end portion which respectively continuously extend from the respective first intermediate portion and the respective second intermediate portion, respectively to the first and to the second of the circumferential end surfaces of the sealing lip;
    each portion of the internal curved line being defined facing the corresponding portion of the external curved line, along the direction from the head of the blade to the root of the blade; and
    the cross section of the sealing lip evolving in a continuous manner from the second cross section to the free axial end of the sealing lip first cross section.

2. The blade according to claim 1, wherein the external curved line forms an image of the internal curved line by a homothetic transformation.

3. The blade according to claim 1, wherein, for each of the internal and external curved lines, the respective median portion has a respective extremum which is offset, in the direction from the head of the blade to the root of the blade, with respect to the respective circumferential ends of the curved line in question, by a distance which is greater than half a distance separating the respective extrema of the respective median portions of the internal and external curved lines, and which is less than one and a half times the distance separating the respective extrema of the respective median portions of the internal and external curved lines.

4. A rotating bladed disk for an aircraft turbine engine, comprising an annular row of blades according to claim 1, distributed about an axis of the rotating bladed disk, and in each whereof the two concentric circle portions, which define the first cross section, have a common center of curvature located on the axis of the rotating bladed disk.

5. The rotating bladed disk according to claim 4, wherein, for each of the blades, a homothetic transformation, whereby the external curved line forms an image of the internal curved line, is a proportional transformation wherein the center is located on the axis of the rotating bladed disk.

6. The rotating bladed disk according to claim 4, wherein, for each of the blades, the respective first and second end portions are circle portions having a common center of curvature located on the axis of the rotating bladed disk.

7. The rotating bladed disk according to claim 4, wherein the respective sealing lips of the blades extend in aerodynamic continuity pairwise.

8. A turbine for an aircraft turbine engine, comprising at least one rotating bladed disk according to claim 4.

9. A turbine engine for an aircraft, comprising a high-pressure core and a low-pressure core, wherein the low-pressure core includes a turbine according to claim 8.

10. A turbine engine for an aircraft, comprising at least one rotating bladed disk according to claim 4.

* * * * *